United States Patent [19]

Gibson

[11] Patent Number: 4,627,165

[45] Date of Patent: Dec. 9, 1986

[54] HAND HELD CUTTING TOOLS

[75] Inventor: Duane M. Gibson, Milwaukie, Oreg.

[73] Assignee: Omark Industries, Inc., Portland, Oreg.

[21] Appl. No.: 730,266

[22] Filed: May 6, 1985

Related U.S. Application Data

[63] Continuation of Ser. No. 583,983, Feb. 27, 1984, abandoned.

[51] Int. Cl.$^4$ ............................................. B27B 23/00
[52] U.S. Cl. ................................... 30/166 R; 30/502
[58] Field of Search .................... 30/166 R, 144, 355, 30/356, 502; 83/835, 852, 853

[56] References Cited

U.S. PATENT DOCUMENTS

| 615,005 | 11/1898 | Walquist | 83/852 |
| 2,356,437 | 8/1944 | Smith | 143/135 |
| 2,685,131 | 8/1954 | Seeberger | 30/355 |
| 3,374,815 | 3/1968 | Anderson et al. | 83/852 |
| 3,810,410 | 5/1974 | Athanasoulas | 83/852 |

Primary Examiner—Douglas D. Watts
Attorney, Agent, or Firm—Robert L. Harrington

[57] ABSTRACT

A hand saw having cutting teeth with a depth limiting design compatable with the forces capable of being generated by an operator. The leading cutting edge is followed by a rearwardly sloping bottom surface that allows the operator to control the bite of the teeth and thereby produce a smoother cutting action.

7 Claims, 9 Drawing Figures

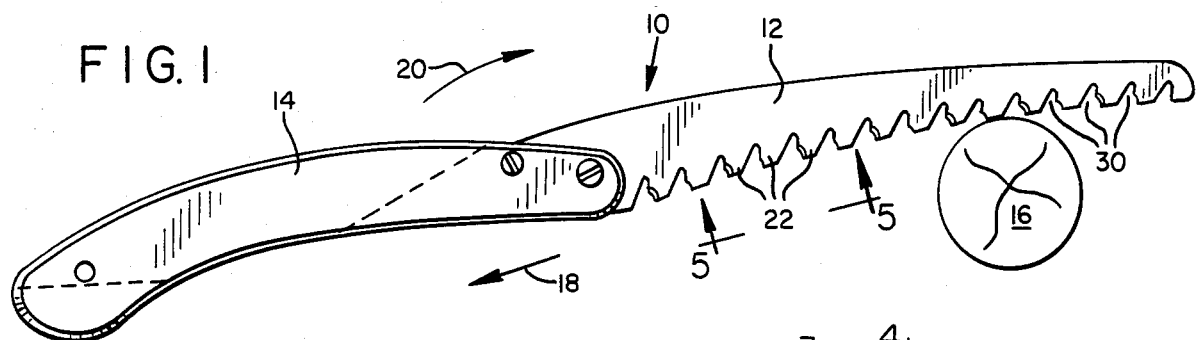
FIG. 1
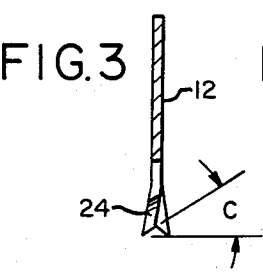
FIG. 3  FIG. 4
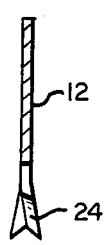
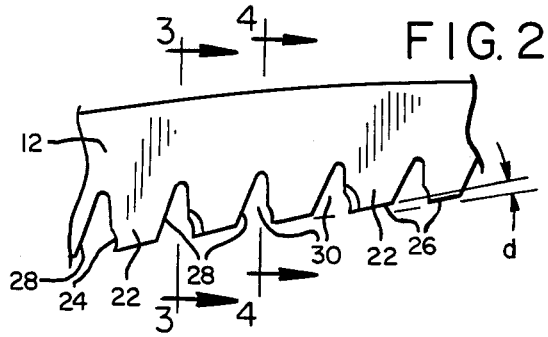
FIG. 2
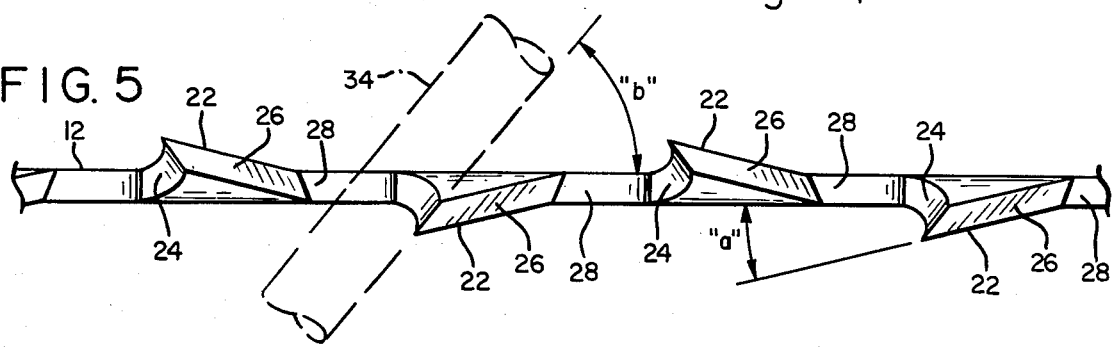
FIG. 5
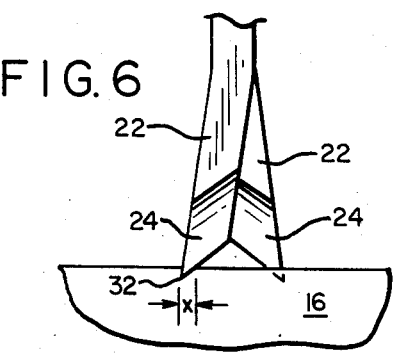
FIG. 6
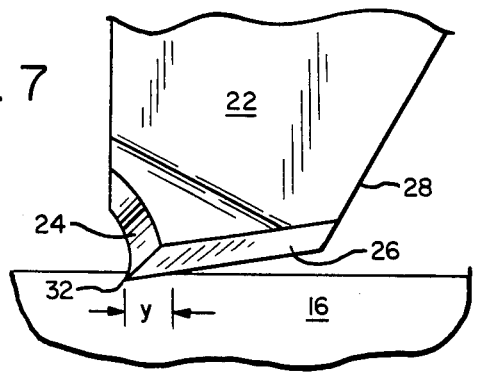
FIG. 7
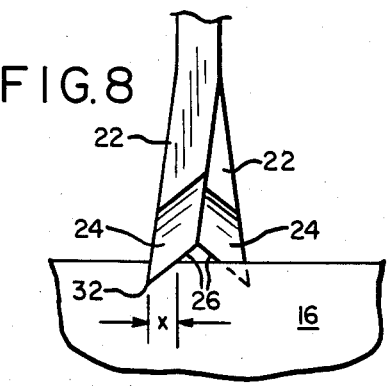
FIG. 8
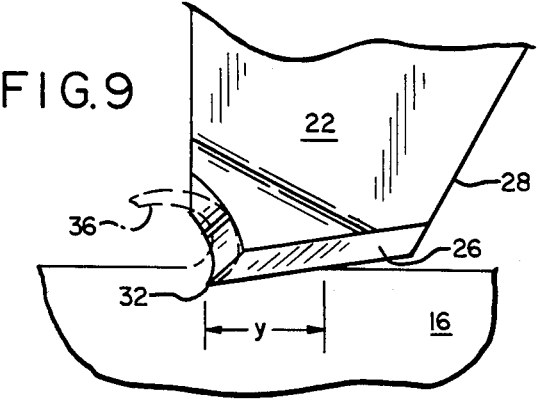
FIG. 9

HAND HELD CUTTING TOOLS

This application is a Continuation of Application for U.S. Patent by Duane M. Gibson, Ser. No. 583,983, filed Feb. 27, 1984 Now Abandoned.

FIELD OF INVENTION

Cutting tools for cutting wood, e.g. for pruning outdoor trees and shrubs and for carpentry applications.

BACKGROUND OF THE INVENTION

Hand held cutting tools are generally of two basic types; hand held knives and hand held saws. The basic design for the knife and saw are similar i.e. an elongated blade is provided with a handle at one end. The basic operation for both is also similar i.e., the blade is drawn back and forth across the desired cutting line while pressure is applied on the blade by a pivotal urging of the operators wrist. The cutting action, however, is quite different. The knife utilizes a continuous cutting edge and slices through and thereby separates the material being cut, while the saw has teeth that individually bite into and remote bits of material thereby digging a trench or kerf as it is commonly called.

The smooth precise cutting action of a knife is highly desireable, but for many applications the knife is simply unsuitable. For example, consider a large tree limb. The sharp edge of the knife will easily slide into the wood but only to a very shallow depth. As the blade enters the cut, the cut has to widen. Wood is "elastically" compressable (more or less depending on the type of wood) and thus penetration is permitted simply by the sides of the blade forcing compression of the wood fibers to thereby enlarge the cut. However, as more of the blade is forced into the cut, the cumulative effect of the resistance by the wood member to this compression very quickly renders it very difficult for the operator to continue cutting.

The hand held saw, having its blade edge made up of a sequence of sharp points, (referred to as teeth) cuts a trench that allows free entry of the blade. Typically, the cutting action of the saw involves a drawing of the saw blade coupled with forward pivoting of the wrist to achieve penetration of the teeth. The teeth dig in and pull loose in a rapidly repetitive action, and in the process, wood particles are ripped or torn loose from the wood member. As the saw teeth are worked back and forth in the cut, the trench is increased until the desired severing of the wood member is accomplished. This cutting action will be herein referred to as stutter cutting.

A major problem with the sawing blade is that at least in start up, the stutter cutting makes it difficult to hold the blade on the desired line of cut. This difficulty is referred to as the saw's tendency to skate and is a major cause of minor accidents experienced by operators placing their off hand too close to the desired line of cut. Also, the cut is ragged, the cutting efficiency is poor, and using the saw is uncomfortable and often a difficult task for the operator. These problems can be reduced by reducing the space between the teeth (depth and length) but to do so limits the ability of the saw to remove the particles and this undesirably effects the saws cutting capabilities.

BRIEF SUMMARY OF THE INVENTION

The present invention is directed to the achievement of a cutting saw wherein the cutting action substantially departs from that of typical stutter cutting of existing saws and approaches more closely the slicing action of a cutting knife, without materially effecting the saws cutting ability. In general, the cutting teeth are designed to penetrate to a controlled depth and to substantially retain that depth to slice away wood chips rather than tear out wood particles. This is accomplished by forming the teeth with an elongated tapered bottom relief surface that controls the depth of cut. With little or no wrist pressure, the point of the teeth are limited to a very shallow depth that is ideal for start up. As a kerf is established, increased wrist pressure achieves increased depth of penetration, bigger bites, and more rapid cutting, all while substantially eliminating the undesirable characteristics of stutter cutting.

DETAILED DESCRIPTION AND DRAWINGS

Having thus briefly described the invention, the preferred embodiment will now be described in detail with reference to the accompanying drawings, wherein:

FIG. 1 is a side view of a pull type pruning saw of the present invention;

FIG. 2 is an enlarged view of a section of the pruning saw of Fig. 1;

FIG. 3 is a view taken on view lines 3—3 of FIG. 2 illustrating a cutting tooth of the saw;

FIG. 4 is a view taken on view lines 4—4 of FIG. 3 illustrating a cutting tooth on the other side of the saw;

FIG. 5 is a bottom view of the pruning saw as taken on view lines 5—5 of FIG. 1;

FIG. 6 is a front view of a cutting tooth, in schematic illustration, as it is entering a wood member in a start up mode;

FIG. 7 is a side view of the cutting tooth illustrated in FIG. 6;

FIG. 8 is a front view of the a cutting tooth illustrated in a full cut mode; and FIG. 9 is a side view of the cutting tooth illustrated in FIG. 8.

Referring to FIG. 1 of the drawings, a pruning saw 10 is illustrated having an elongated blade 12 to which a handle 14 is attached at one end. The saw 10 is a pull type saw, meaning that it is designed to cut as the blade 12 is being pulled over and through a limb 16 as indicated by arrow 18. The forward or push motion of the saw is simply a return motion with little or no cutting taking place. (The invention is however, readily applicable to push type saws wherein the cutting teeth are reversed.) In general, the sawing action involves the gripping of the handle 14 and while reciprocally drawing the blade in the cutting direction 18 with the cutting bottom edge of the blade engaging limb 16, the handle is urged in a forward pivotal motion as indicated by arrow 20 for urging the blade 12 into the limb 16.

Referring now to FIGS. 2 through 5, it will be understood that the cutting edge of the blade 12 comprises a sequence of cutting teeth 22. Each cutting tooth 22 includes a front surface 24 and a bottom surface 26. These surfaces are formed to cooperatively produce the controlled cutting function previously described. The tooth configuration is completed by the forming of the rear surface 28 which, together with the front surface of the following tooth, forms gullet 30 i.e., the relief for removal of wood chips which is further explained in the "Operation" section.

As will be apparent by reference to FIGS. 3, 4, and 5, the teeth 22 are alternately bent outwardly from the side of the blade 12, first to the right side and then to the left side of the blade. This bending is a combination of bending and twisting to force the bottom surface 26 outwardly at an angle "a" (FIG. 5) relative to the side of the blade. This bending locates the point 32, which is the intersection of the outside edge of surfaces 24 and 26, as the outermost point of the tooth 22. (This outward positioning of point 32 is typically referred to as the "set" of the saw.)

The front surface 24 is formed, as by grinding, to have an angle "b" (FIG. 5) relative to the plane of the blade. Using a round abrading surface such as a grinding wheel with a rounded edge (used primarily in production) or a round file 34 produces the desired hook shape illustrated in FIG. 2. The bottom surface 26 is also angled sidewardly and inwardly (inwardly meaning from the bottom edge of the blade toward the opposite or upper edge of the blade) from its outer side edge as by grinding to form an angle "c" (FIG. 3) and is further angled rearwardly and relative to its leading edge to form angle "d" relative to the direction of cut (FIG. 2). The stet stet "c" will sometimes be hereafter referred to as the limiting edge, and the bottom surface 26 as the limiting or controlling surface.

SPECIFIC DIMENSIONS

A specific design of a pruning saw which has been produced and utilized, demonstrating the advantages of the invention herein dislosed, will now be described.

A blade was blanked from 1075 steel having a thickness of 0.0425 inch. The blade is 10.250 inches long with a varying height from about 1.750 inches at the handle to about 1.0750 inches at the opposite, or distal, end. The blade is slightly concave with a radius of about 55 inches. These dimensions are typical of pruning saws and other dimensions and configurations typical of pruning saws will easily suffice.

The saw is provided with 25 cutting teeth with notches or "gullets" formed 0.250 inch deep. One side of the notch is on a radial line (relative to the concave curvature) which ultimately forms front surface 24, and The other side of the notch is at a 35 degree angle therefrom and forms the rear surface 28 of the preceeding tooth. The length of the controlling surface 26 is about 0.250 inch i.e. a substantial length sufficient to occupy a major portion of the distance between successive teeth so as to resist the depth seeking force of the front surface 24, and limit the depth of engagement of the following tooth. The tooth is twisted to form angle "a" by setting the point 32 outward from the side of the blade a distance 0.020 inch. The front surface 24 is formed with a round file 34 having a diameter of about 0.078 inch, set out at an angle "b" of 30 degrees. Top surface 26 is ground with a side angle "c" of 30 degrees and a length angle "d" of about 4 degrees.

The tooth bottom surface 26 is thus greater than the gullet 30 0.250 inch to about 0.160 inch) by an approximate ratio of 3 to 2, which of course can be increased without jeopardizing performance.

OPERATION

The operation of a hand held saw of the present invention is illustrated in the schematic drawings of FIGS. 6 thru 9. FIGS. 6 thru 9 show only one of the cutting teeth but it will be readily appreciated that a preceding or following cutting tooth will operate in a similar manner on the other side of the saw blade 12.

FIGS. 6 and 7 illustrate the cutting tooth in a start up mode. With very little pressure applied to the blade, the point 32 is maintained at a shallow depth by reason of the resistance generated by the expanding width x and length y of the tooth that must be forced into the wood 16. With this shallow penetration, the tooth merely scratches the wood surface at a consistent depth and stutter cutting is avoided. Starting the cut on a desired cutting line is thus easily achieved.

After several passes of the saw blade, a sufficient depth is achieved to confine the blade in the cutting line and additional pressure can be safely applied i.e., by pivotal pressure 20 applied by the opeators hand and wrist. The increased pressure will increase the depth of cut e.g., as illustrated in FIGS. 8 and 9. However, by appropriate design and referring specifically to the angles "c" and "d", the resistance of x and y are rapidly built up and restrict the amount of penetration that can reasonably be applied by the operator. Thus a balancing is achieved whereby the drawing force 18 necessary to pull the point 32 through the wood does not exceed the operators ability to hold the teeth in the cut. The result is a steady and smooth cutting action, whereby wood chips 36 are stripped from the wood member 16.

Whereas applicant does not wish to be bound to this theory, it is believed that the cutting control that is achieved is largely a result of the elastic compressability of wood fibers. As the cutting edge of the tooth takes its bite, the wood tries a partially fold back behind the cutting edge where it engages the limiting edge of the tooth. The greater the bite the greater this engagement and in the same manner as described for the knife, resistance to such further penetration quickly builds up and offsets the forces tending to bury the cutting tooth. The unrestricted "digging in" of the prior cutting teeth are believed to be the primary cause of stutter cutting. This is supported by the relatively smooth cutting action that is achieved by the present device.

The wood chips (and the wood particles in prior saws) have to be carried out of the kerf and thus a sufficient gullet 30 (the relief area formed by the notch) has to be provided. However, as noted from the drawings, the gullet 30 occupies a minor portion of the spacing between the successive cutting edges as compared to the major portion occupied by the rear controlling surface 26. Experience teaches that a notch 0.25 inch deep is desireable for this reason. Also, it has been found that the curved front surface 24 is beneficial in directing the flow of the chips 36 away from the cutting point 32.

MODIFICATIONS

It will be understood that different types of wood have different degrees of cutting difficulty and thus a more or less agressive cutting tooth then herein described may be desirable. Such agressiveness is varied by changing the angles "a", "b", "c" and "d". It has been found that acceptable ranges for these angles are: angle "a" between 3° and 6°; angle "b" between 25° and 40°; angle "c" between 0° and 45°; and angle "d" between 1° and 7°. (The desired angle "c" is greatly effected by the width of the blade and a very narrow blade used in soft wood will permit the 0° angle configuration.) The length of the tooth can be changed as well in that only a relatively small portion, length y of FIG.

7, is utilized for limiting penetration. However, as the cutter is repeatedly resharpened with file 34, this length is gradually shortened and thus the life of the saw is effected by shortening the length of the tooth.

Whereas the invention has been found to be most beneficial to hand held wood cutting saws, this is believed due to the particular properties of wood, the slow cutting motion and power limitations inherent in manual cutting, and the design of manual saws which dictate the application of that power. Other forms of cutting having similar conditions might very well benefit from the invention, which accordingly is not limited to the specific embodiment shown but is encompassed by the claims appended hereto.

I claim:

1. A hand saw for severing wood materials comprising; a handle and an elongated blade extended therefrom, said elongated blade having a bottom cutting blade edge designed for cutting by lengthwise reciprocation of the blade defining thereby a cutting direction, said cutting blade edge formed by a series of cutting teeth, the spacing between the teeth forming gullets for carrying wood chips, certain of said teeth having a depth seeking front surface and a depth controlling bottom surface cooperatively formed for controlled depth cutting of the wood material, said front surface and bottom surface intersecting to form a leading cutting edge having a leading cutting point, said depth controlling bottom surface being angled rearwardly and inwardly relative to the cutting direction from the cutting edge within a shallow angular range, and said bottom surface extending from said cutting edge a major portion of the distance between successive teeth with the length of the bottom surface and the length of the gullet having a ratio in the range of about 3 to 2 and greater, said controlling bottom surface being angled laterally and inwardly from one side edge to the other side edge, and said combination of angles and extended bottom surface providing operator control to controllably limit the depth of engagement of the preceding and succeeding cutting teeth.

2. A hand saw as defined in claim 1 wherein the shallow angular range of the bottom controlling surface rearward from the cutting edge ("d") is between 1° and 7° and extends for a distance of at least about 0.250 inch.

3. A hand saw as defined in claim 2 wherein said front surface of said certain cutting teeth is angled from one side edge of the front surface to the other side edge of the front surface, rearwardly relative to the elongated blade and its cutting direction to form with said bottom controlling surface a rearwardly and inwardly angled cutting edge with the forwardmost point of the cutting edge forming the leading cutting point, said cutting teeth being offset to project said cutting point outwardly from the side of the blade and with various ones of said certain cutting teeth having cutting points on one side of the blade and other ones of said certain cutting teeth having leading cutting points on the other side of the blade to cut a kerf wider than the width of the blade.

4. A hand saw as defined in claim 3 wherein said cutting edge angle ("b") is within the range of 25° to 40° from the plane of the blade, and said cutting teeth are angularly offset relative to the plane of the blade within a range of 3° to 6° ("a").

5. A hand saw as defined in claim 1 wherein said lateral angle of the bottom controlling surface ("c") is within the range of 0° to 45°.

6. A hand saw as defined in claim 5 wherein the rearward angle ("b") of the front surface is formed with a round abrading surface to provide a hooked configuration in the cutting tooth.

7. A hand saw for severing wood materials comprising; a handle and an elongated blade extended therefrom, said elongated blade having a curved bottom cutting blade edge designed for cutting by lengthwise reciprocation of the blade defining thereby a cutting direction, said cutting blade edge formed by a series of cutting teeth, the spacing between the teeth forming gullets for carrying wood chips, certain of said teeth having a depth seeking front surface and a depth controlling bottom surface cooperatively formed for controlled depth cutting of the wood material, said front surface and bottom surface intersecting to form a leading cutting edge having a leading cutting point, said depth controlling bottom surface being angled rearwardly and inwardly relative to the cutting direction from the cutting edge within a shallow angular range and extending from said cutting edge a major portion of the distance between successive teeth, said controlling bottom surface being angled laterally and inwardly from one side edge to the other side edge, said combination of angles providing operator control to controllably limit the depth of engagement of the preceding and succeeding cutting teeth.

* * * * *